(12) United States Patent
Vernon-Dier

(10) Patent No.: US 7,199,529 B2
(45) Date of Patent: Apr. 3, 2007

(54) INDUCTIVE LIGHTING SYSTEM WITH BACK-UP BATTERY

(75) Inventor: David Richard Vernon-Dier, Woodham Village Co. (GB)

(73) Assignee: GDRC Limited, Basingstoke, Hampshire (GB)

( * ) Notice: Subject to any disclaimer, the term of this patent is extended or adjusted under 35 U.S.C. 154(b) by 81 days.

(21) Appl. No.: 10/508,827

(22) PCT Filed: Feb. 28, 2003

(86) PCT No.: PCT/GB03/00837

§ 371 (c)(1),
(2), (4) Date: Apr. 27, 2005

(87) PCT Pub. No.: WO03/081745

PCT Pub. Date: Oct. 2, 2003

(65) Prior Publication Data

US 2005/0212454 A1    Sep. 29, 2005

(30) Foreign Application Priority Data

Mar. 22, 2002 (EP) .................................. 0206798

(51) Int. Cl.
*H05B 41/16* (2006.01)
(52) U.S. Cl. ................ 315/256; 315/255; 315/277; 315/86; 315/316
(58) Field of Classification Search ................ 315/256, 315/255, 277, 86, 316, 324; 361/67, 38
See application file for complete search history.

(56) References Cited

U.S. PATENT DOCUMENTS

| | | | | |
|---|---|---|---|---|
| 2,265,475 A | | 12/1941 | Fodor | |
| 3,833,817 A | * | 9/1974 | Patel | ............................ 307/66 |
| 4,293,799 A | * | 10/1981 | Roberts | ....................... 315/256 |
| 5,579,197 A | * | 11/1996 | Mengelt et al. | ............. 361/93.4 |
| 6,107,744 A | * | 8/2000 | Bavaro et al. | ................. 315/86 |
| 2004/0062055 A1 | * | 4/2004 | Rozenberg et al. | ......... 362/555 |

FOREIGN PATENT DOCUMENTS

| | | |
|---|---|---|
| EP | 0 453 006 | 10/1991 |
| FR | 2 695 285 | 3/1994 |
| JP | 0313605 | 2/1991 |
| JP | 07169572 | 7/1995 |
| JP | 08180980 | 7/1996 |
| JP | 2000222916 | 8/2000 |
| WO | WO 96 02970 | 2/1996 |
| WO | WO 02 16826 | 2/2002 |

* cited by examiner

*Primary Examiner*—Tuyet Thi Vo
(74) *Attorney, Agent, or Firm*—Alfred A. Fressola; Ware, Fressola, Van Der Sluys & Adolphson, LLP

(57) ABSTRACT

A pathway lighting system has self-contained, battery up scaled lighting modules (20), each module including at least one secondary coil. A plurality of primary coils are housed within a carrier assembly (1) together with voltage circuitry (14). Primary and secondary coils, positioned in the carrier assembly and in the lighting modules and the respectively allow electricity to flow between these members. The secondary coil output voltage is able to be rectified with the use of a rectification circuit, housed in the lighting module. Upon a mains failure, a battery charger/changeover circuit would switch the power requirements of the light sources inside the pathway lighting module over to internal back up batteries.

17 Claims, 8 Drawing Sheets

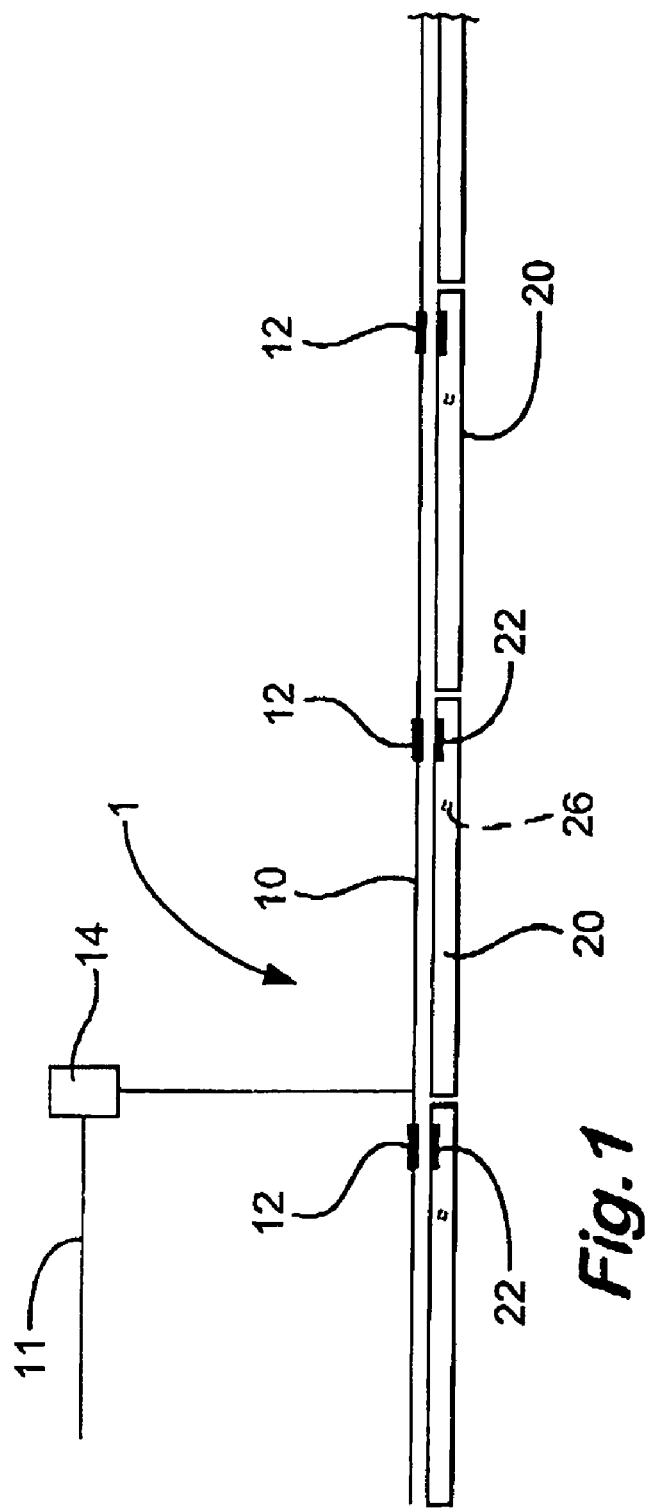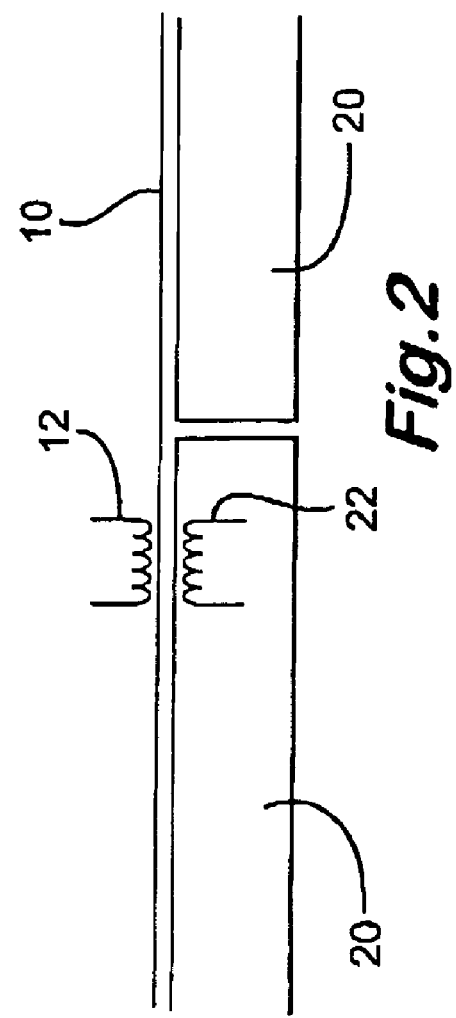

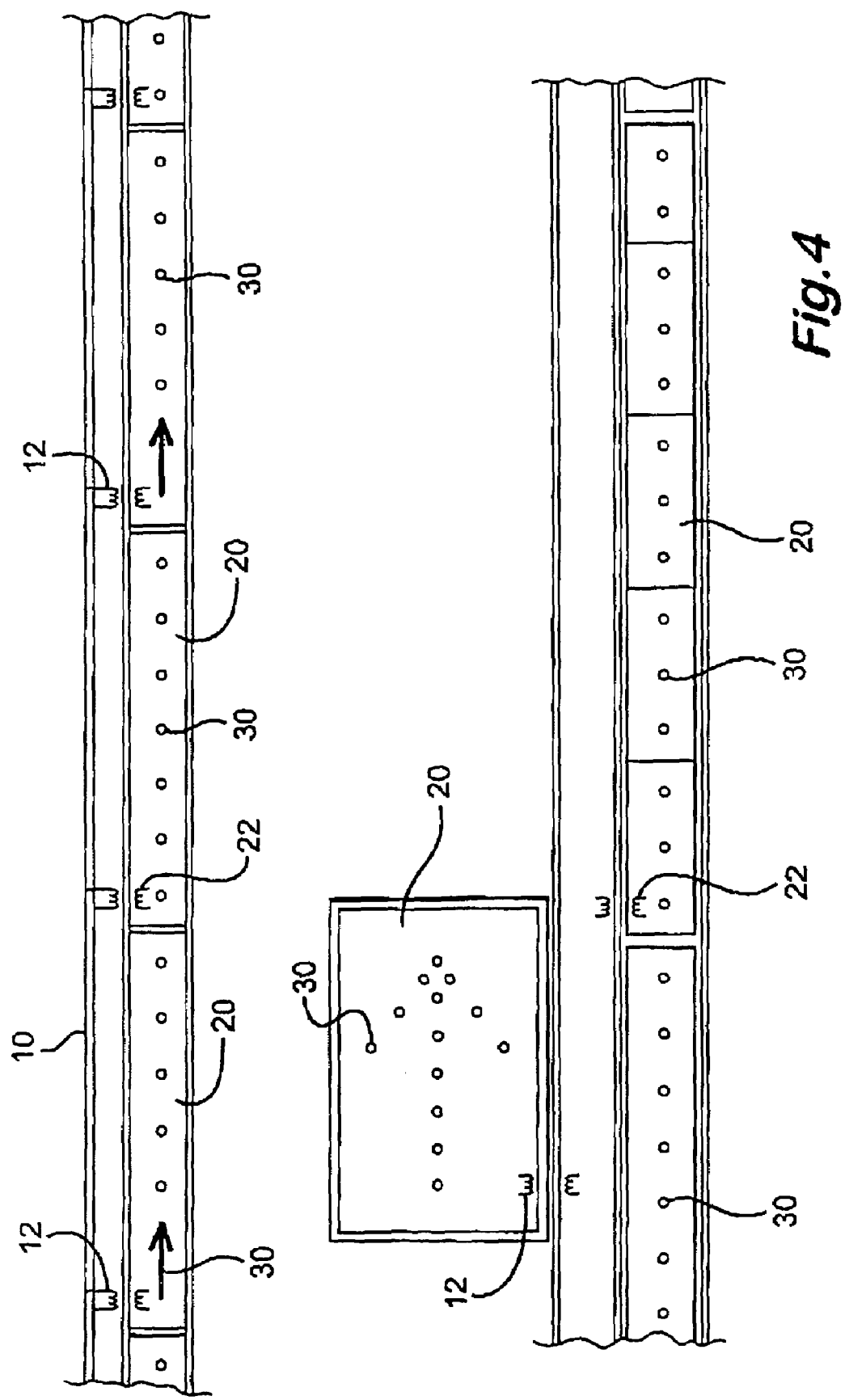

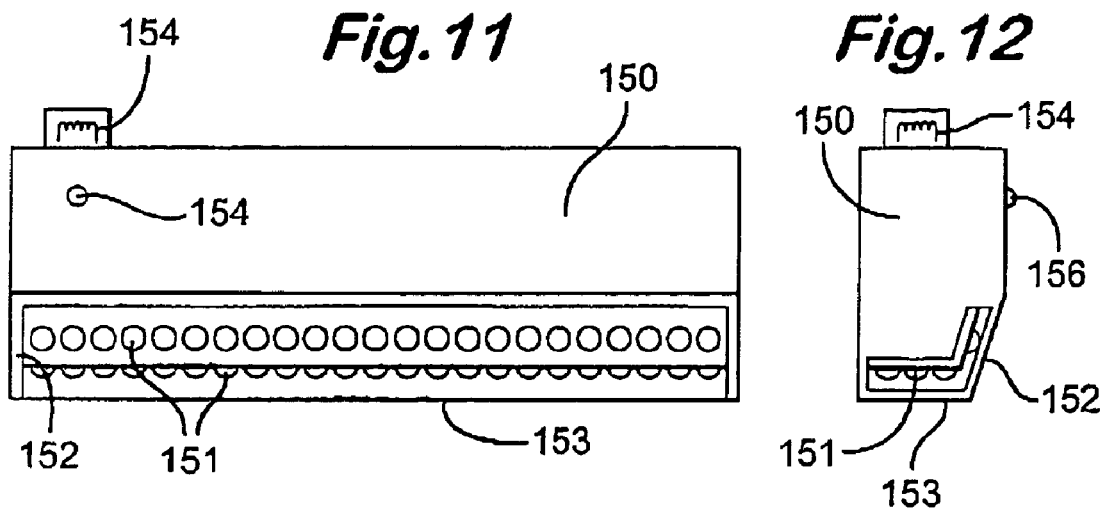
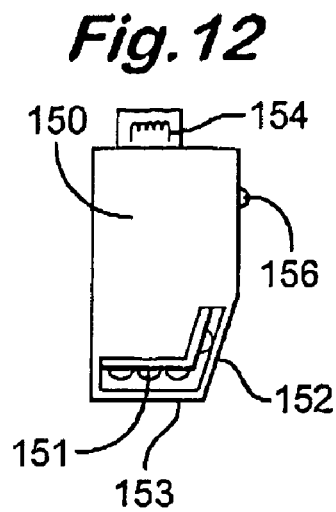
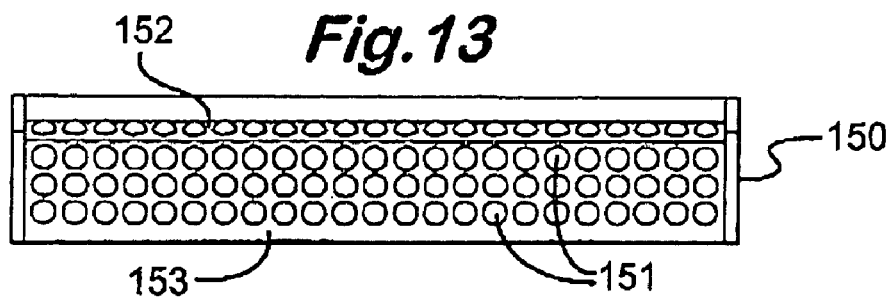
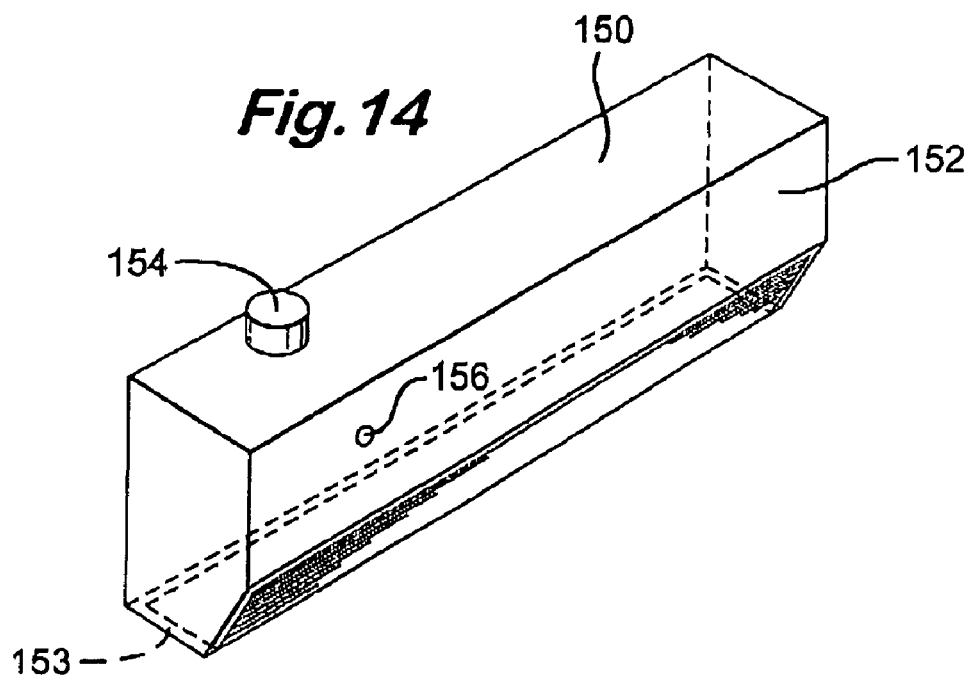

INDUCTIVE LIGHTING SYSTEM WITH BACK-UP BATTERY

CROSS-REFERENCE TO RELATED APPLICATIONS

This application is for entry into the U.S. national phase under §371 for International Application No. PCT/GB03/00837 having an international filing date of Feb. 28, 2003, and from which priority is claimed under all applicable sections of Title 35 of the United States Code including, but not limited to, Sections 120, 363 and 365(c), and which in turn claims priority under 35 U.S.C. §119 to Great Britain Patent Application No. 0206798.1 filed on Mar. 22, 2002.

TECHNICAL FIELD

The present invention relates to lighting system, particularly though not exclusively for use in emergency pathways.

BACKGROUND OF THE INVENTION

Existing emergency pathway lighting systems typically consist of a linear system whereby one section of pathway lighting supplies power to the next section. The creation of an illuminated pathway is therefore reliant on links between pathway modules. Generally, printed circuit boards, housed in pathway modules, adjoin each other via wire connections and therefore have an electrical means of interconnection. A central power supply unit, generally connected to the mains supply, supplies power the first lighting module, which in turn supplies power to the second lighting module, and so on. The power supply also has a battery back-up unit that is activated when there is a mains failure.

However, the prior art has many potential failure points. The presence of water in the central power supply, containing the emergency battery back-up could cause the back-up to short circuit, resulting in a complete failure of the pathway system. If either the electrical supply line from the battery back-up to the pathway system or any of the pathway modules links suffer a breach, then a failure of the pathway system from the point of breach will occur. If any individual pathway lighting module suffers from electrical damage, then the subsequent modules would fail.

SUMMARY OF THE INVENTION

The object of the present invention is to provide an improved lighting system.

According to the invention there is provided a lighting system comprising:
- a carrier for a primary source of electricity, including a plurality of primary coils;
- a plurality of sealed lighting modules, each including
  - at least one secondary coil, each for electro-magnetically linking with one of the primary coils; and
  - at least one light source.

While the primary source of electricity will generally be mains electricity, it may be any other electricity source. For example such as produced by a generator, or the main supply on a ship or an aircraft, or from a step down voltage from the mains.

Usually each lighting module will include a battery back-up, preferably together with suitable switch-over circuitry, such that if the primary source of electricity fails, the lighting module will function on battery power. Generally charging circuitry will also be provided for the battery.

Conveniently each lighting module can further be provided with rectification means, such that if the primary source of electricity is of ac this can be converted to dc for the light source, if necessary.

Typically the light source is at least one LED. For use as an emergency pathway lighting the light sources may be in the form of shapes. Advantageously the shapes are directional arrows. Alternatively the shapes are pictograms, for example indicating the position of a fire escape or fire extinguisher. In another alternative the shapes can words.

The modules are adapted to be housed in continuous castings.

According to a second aspect of the invention there is provided a sealed lighting module for use with a carrier for a primary source of electrictity, and having a plurality of primary coils, the lighting module comprising;
- a least one secondary coil for electromagnetic induction from a primary coil; and
- at least one light source.

Usually each lighting module will include a battery back-up, preferably together with suitable switch-over circuitry, such that if the primary source of electricity fails, the lighting module will function on battery power. Generally charging circuitry will also be provided for the battery.

Conveniently each lighting module can further be provided with rectification means, such that if the primary source of electricity is of ac this can be converted to dc for the light source, if necessary.

Typically the light source is at least one LED. For use as an emergency pathway lighting the light sources may be in the form of shapes. Advantageously the shapes are directional arrows. Alternatively the shapes are pictograms, for example indicating the position of a fire escape or fire extinguisher. In another alternative the shapes can words.

BRIEF DESCRIPTION OF THE DRAWINGS

To help understanding of the invention, a specific embodiment thereof will now be described by way of example and with reference to the accompanying drawings, in which:

FIG. 1 shows a lighting system according to the present invention;

FIG. 2 shows in larger scale from FIG. 1, the positioning for electromagnetic induction between the primary coils and the secondary coils;

FIG. 4 shows the system of the invention in use with a series of sealed lighting modules each housing an array of lighting elements;

FIG. 11 is a large lighting module designed for downward and outward lighting;

FIG. 12 is an end view of the lighting module of FIG. 11;

FIG. 13 is a bottom view of the lighting module of FIG. 11; and

FIG. 14 is a perspective view of the lighting modules of FIG. 11.

DETAILED DESCRIPTION

Figure 3:
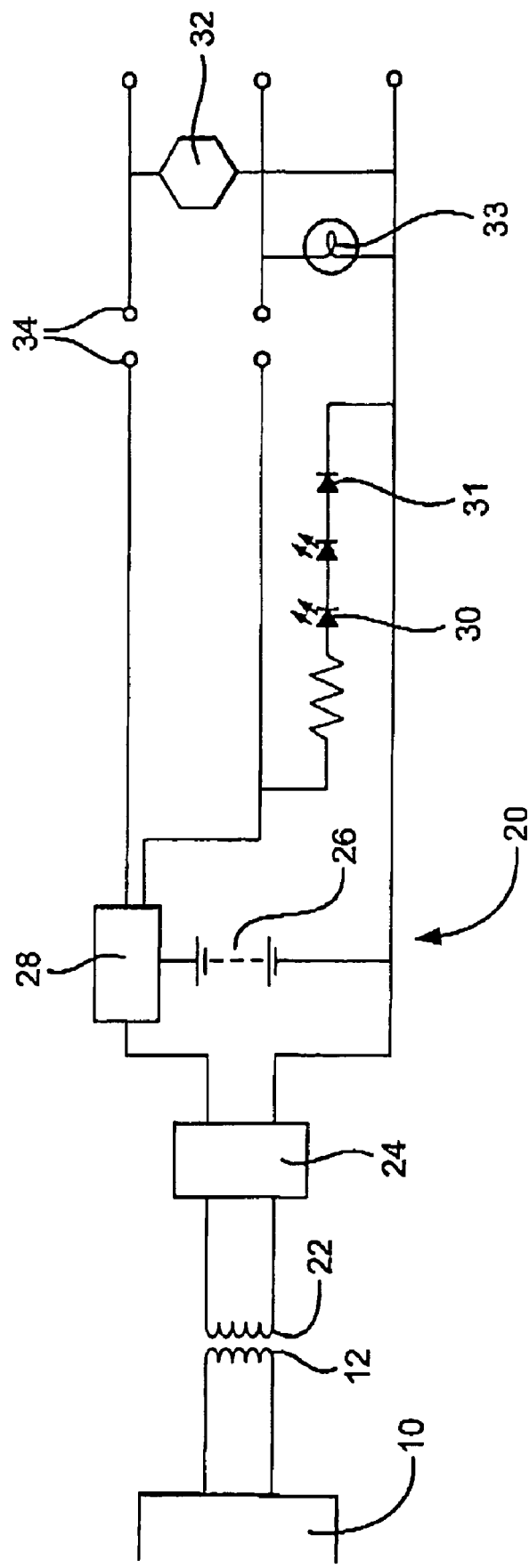
FIG. 3 is a schematic diagram of the lighting system of FIG. 1.

Referring to the drawings, FIG. 1 shows the lighting system of the invention 1. A carrier 10 is provided for supplying mains electricity 11 to the system 1. Positioned along the carrier are primary coils 12. The primary coils are fully encapsulated in the carrier and as such cannot be adversely Affected by on influx of water, for example during an emergency. The carrier is made from a suitable thermoplastic such as polycarbonate or polyproplyene.

The system also includes lighting modules 20. The modules 20 include secondary coils 22 which electro-magnetically link to the primary coils 12 for inducing electricity flow in the lighting modules 20. Battery back up 26 is also provided in the modules 20. The carrier assembly also includes voltage-conditioning circuitry 14.

The lighting modules 20 are designed to be sealed units to prevent the ingress of water or noxious gases that may cause failure of the circuitry. Thus, if the mains electricity fails, the lighting modules 20 will continue to function. This is important in an emergency situation, such as a fire, where it is important to direct people to the nearest exit or safety point.

FIG. 2 shows in larger scale from FIG. 1, the positioning for electromagnetic induction between the primary coils 12 and the secondary coils 22. As discussed above, fully encapsulating the primary coils 12 and providing the secondary coils 22 in the fully sealed lighting modules, prevents the system from being susceptible to the ingress of moisture. Flow of electricity is induced in the secondary coils 22 by induction from the flow of electricity in the primary coils 11, and as a result, both the primary coils 11 and the secondary coils 22 can be sealed and thus impervious to water.

As shown in FIG. 3, the lighting modules 20, further include rectification means 24 for converting the ac current of the mains supply to dc current. A battery back up 26 is provided in each lighting module 20, such that in the event of mains failure, the lighting module can be powered by the battery 26. Change over circuitry 28 is provided to enable to battery to be charged when the mains electricity is functioning, and to power the lighting module in the event of failure thereof.

In an alternative, the battery and charging circuit can be provided as an "eco battery" whereby the light sources in the lighting module run on the power provided by the battery. When the power in the battery falls below a predetermined level the charging circuit switches to re-charge the battery and power the light sources via the secondary coils.

The lighting modules include light sources 30. Typically, these will be LEDs. As shown two LEDs 30 are provided with a rectifier 31 to as voltage protection. However, other light producing devices such as standard light bulbs 33 or fibre optics can be used. Reflectors (not shown) may also be provided. As shown the lighting modules additionally include a sounding device 32 and sockets 34 for the connection of other devices. All the components are mounted on a printed circuit board.

FIG. 4 shows the system of the invention in use with a series of sealed lighting modules 20 each housing an array of lighting elements 30. Each lighting module 20 is positioned with its secondary coil 22 arranged for electromagnetic induction from the primary coils 12 encapsulated in the carrier 10.

One of the main advantages of the system of the present invention is that the lighting modules can be provided in a variety of different shapes and designs for use in particular situations or places. FIGS. 5–14 give examples of particular lighting modules.

Figure 5A:
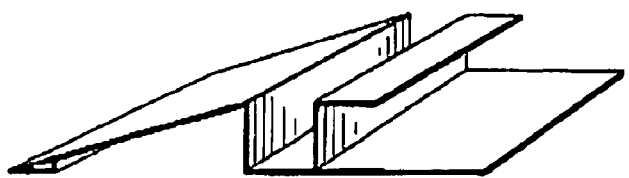
FIGS. 5A–5H show a variety of tracks for holding the lighting system.
Figure 5B:
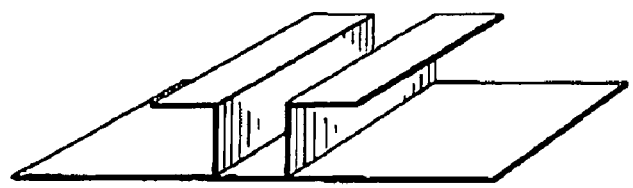
Figure 5C:
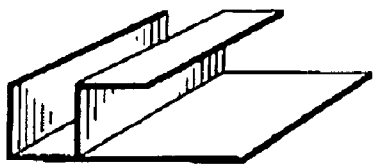
Figure 5D:
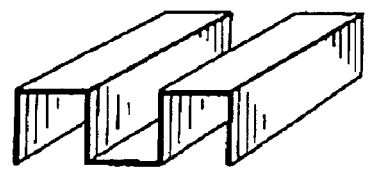
Figure 5E:
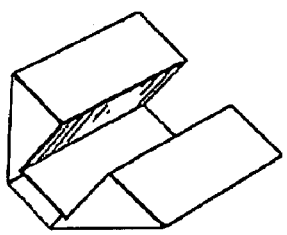
Figure 5F:
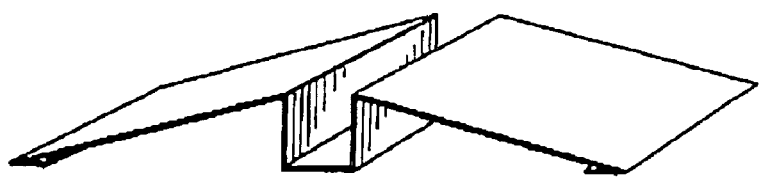
Figure 5G:
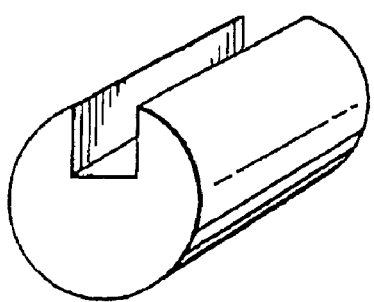
Figure 5H:
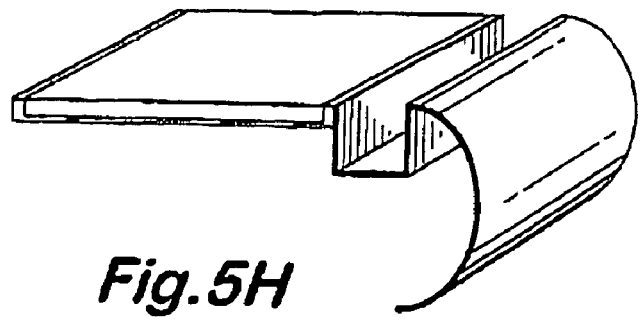

FIG. 5 shows a variety of tracks including the carrier can be provided for accommodating the lighting system FIG. 5*a* is a carpet to smooth floor track; FIG. 5*b* is a carpet to carpet track; FIG. 5*c* is a carpet to wall track FIG. 5*d* is a universal track; FIG. 5*e* is a corner track; FIG. 5*f* is a ramp track; FIG. 5*g* is a hand rail track; and FIG. 5*h* is a stair capping track.

Figure 6A:
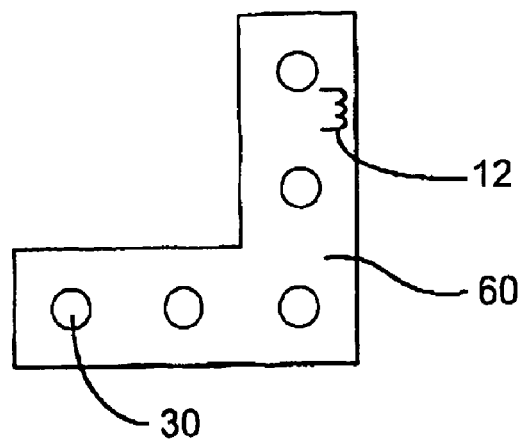
FIGS. 6A–6C show different arrangements of light sources according to the present invention.
Figure 6B:
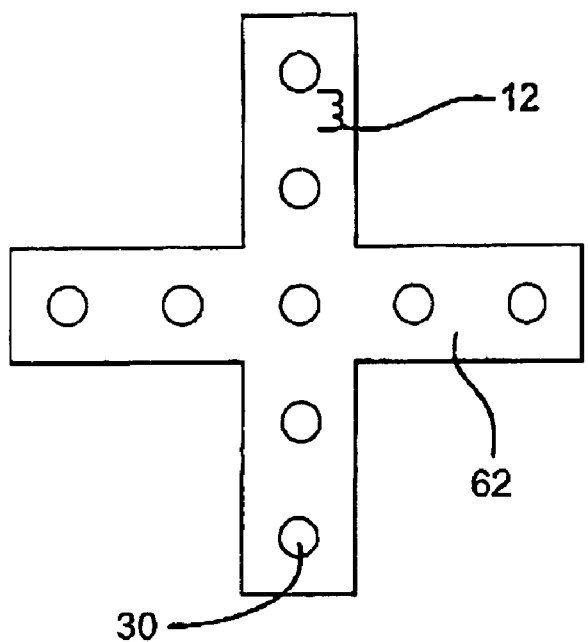
Figure 6C:
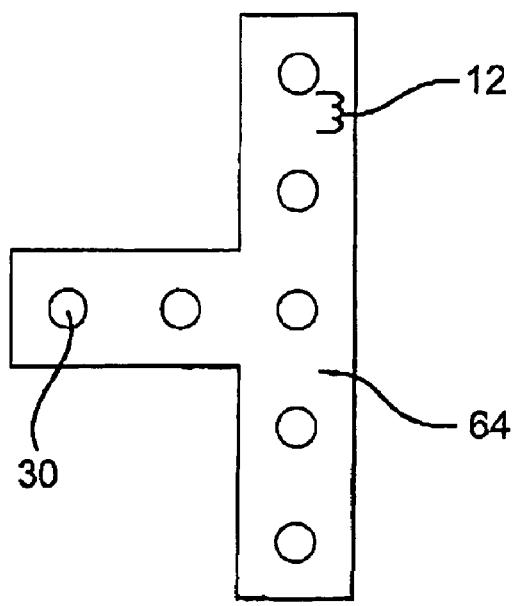

FIG. 6 shows different arrangements of light sources from a secondary coil 12. FIG. 6*a* shows five light sources 30 arranged on a board 60 in the shape of a right angle or possible arrow head. FIG. 6*b* shows the light sources 30 arranged on a board 62 in the shape of a cross; and FIG. 6*c* shows the light sources arranged on a board 64 in the shape of a T-piece.

Figure 7:
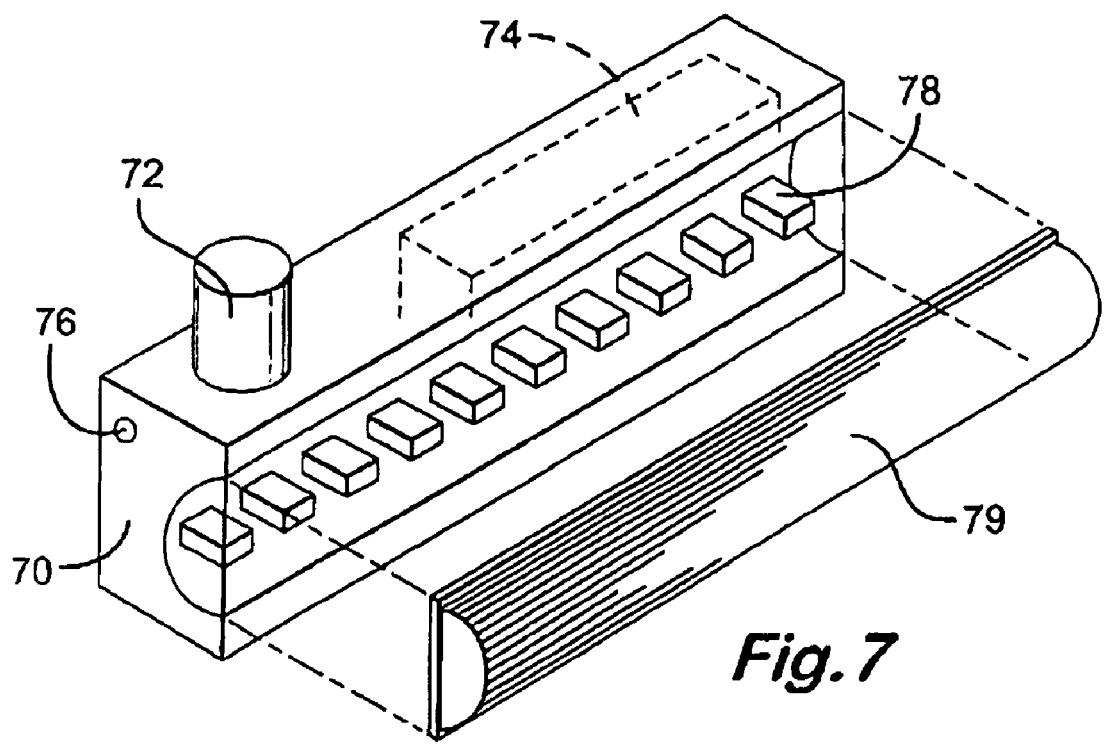
FIG. 7 is a perspective view of a bulkhead-type lighting module according to the present invention.

FIG. 7 is a bulkhead-type lighting module. As described above, the module 70 is a sealed unit and is provided with a secondary coil 72 for the electromagnetic induction from the primary coil in a carrier (not shown). In addition back-up batteries 74, and a battery indicator, 76 are provided. Light sources 78 are also provided with a reflector 79 to enhance and direct the lighting effect therefrom.

Figure 8:
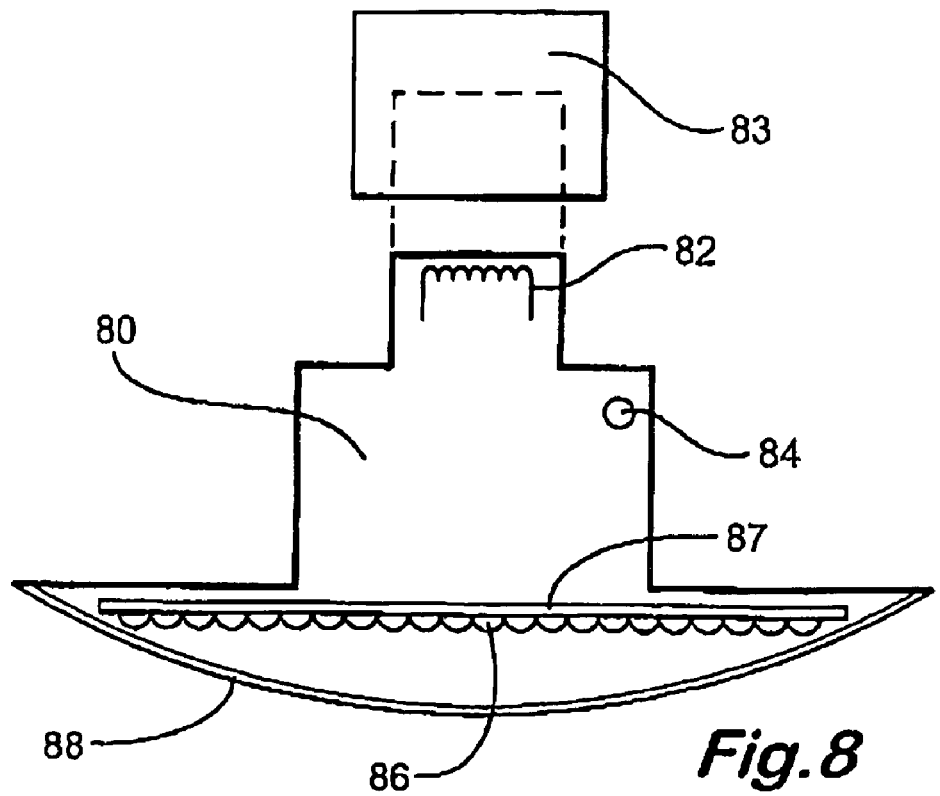
FIG. 8 is a lighting module in the shape of a standard light bulb.

FIG. 8 is a further lighting module, this time in the shape of a standard large light bulb 80. As before the module includes a secondary coil 82 for interaction with a primary coil on a carrier 83. Back-up batteries are provided inside the unit (not shown) and a battery indicator light is also provided 84. LED light sources 86 are provided on a printed circuit board 87 beneath a lens face 88. The choice of lens can result in the module being either a flood light, a spot light, a beam light or the like.

Figure 9:
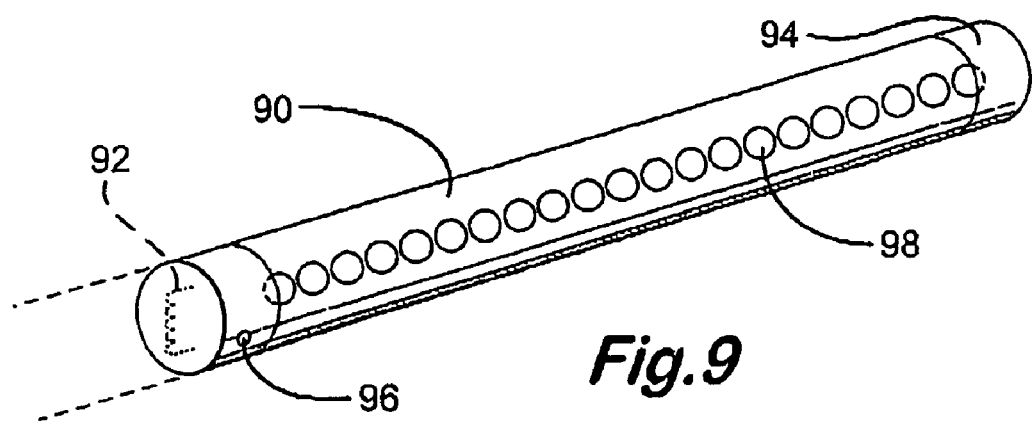
FIG. 9 is a lighting module in the shape of a baton.

In the embodiment shown in FIG. 9, a lighting module is shown in the shape of a tubular light bulb 90, or batton. It is provided with a secondary coil 92 for connection with a primary coil of a carrier (not shown). The body 94 of the module is provided as a sealed unit, and including the battery back up, rectification circuitry, charging circuitry as described above. The module also has a battery level indicator 96. A plurality of LEDs 98 are arranged along the centre of the module.

Figure 10:
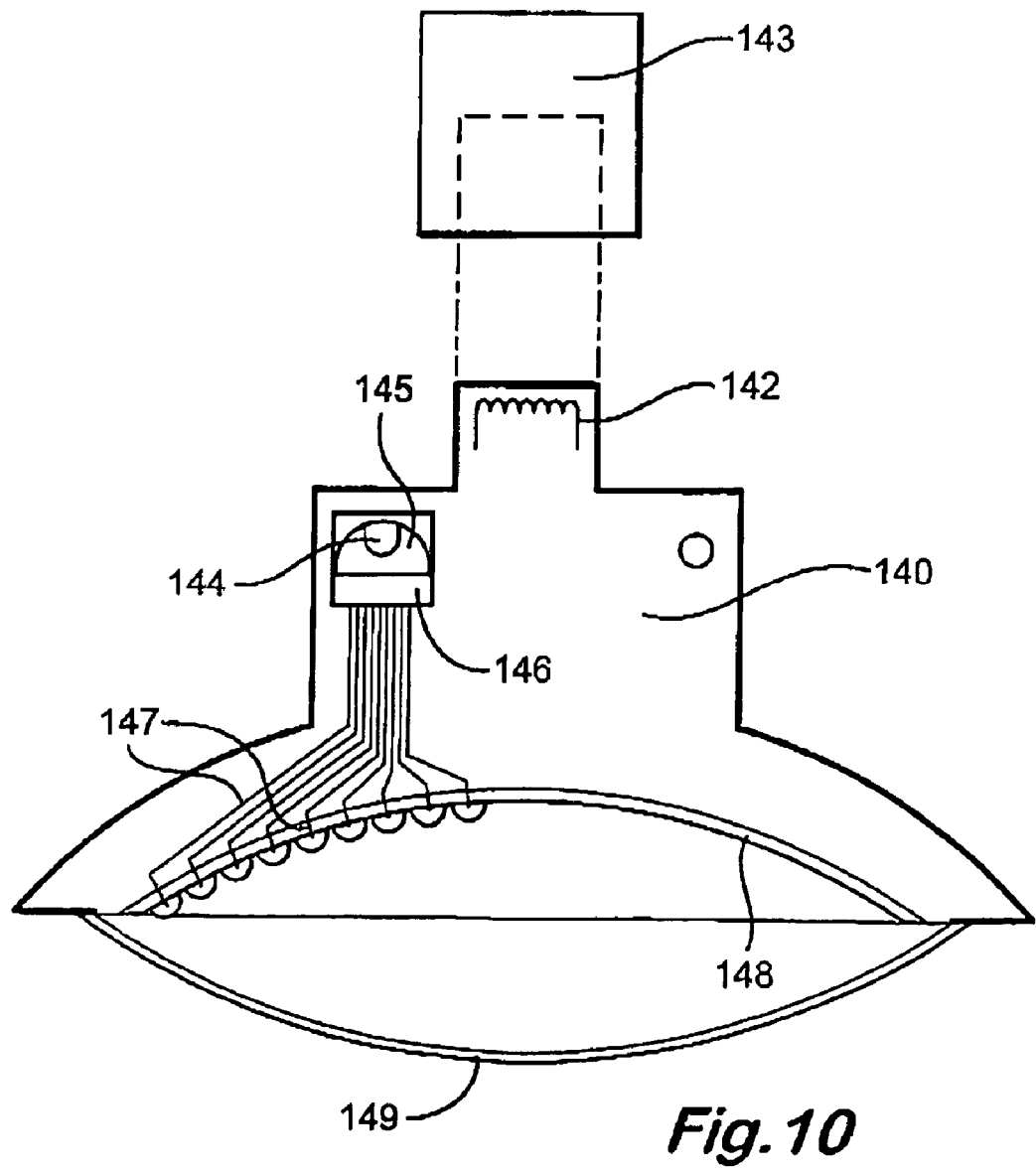
FIG. 10 is a further lighting module incorporating a reflector.

FIG. 10 shows a lighting module 140 designed in the form of a standard light bulb. The module includes a secondary coil 142 for induction from a primary coil on a carrier 143. Light sources 144 are housed in chambers 145 at one end of the module. A fibre optic bundle 146 is provided in each light source with their end collectors arranged to convey light from the light source 144 through the fibres 147. The fibres pass convey light from the light sources 144 to a reflector 148 provided at the other end of the module. A lens 149 is also provided to enhance or direct the light from the module.

FIGS. 11–14 shows are large lighting module 150 in accordance with the invention. An array of LEDs 151 is provided around two edges 152, 153 of a sealed unit, for illumination both outwards and downwards from the unit. As with the lighting modules described above, this module is a self contained sealed unit. It is provided with a secondary coil 154 for electromagnetic induction from a primary coil on a carrier as shown in FIG. 1. Inside the unit, not shown are back-up batteries, as described before. So that the user can be confident that the back up battery is fully charged, a indicator light 156 is provided to indicate that the battery holds sufficient power. Again, as with the lighting modules described earlier, this lighting module 150 includes the rectification, change-over and battery charging circuits described above, not shown.

The invention is not intended to be restricted to the details of the above-described embodiment. For instance, the lighting modules and the carrier can be provided in many other shapes and designs for use in particular situations.

The invention claimed is:

1. A lighting system comprising:
   a separate carrier for a primary source of electricity, the carrier including a plurality of primary coils;
   a plurality of sealed lighting modules, each including
      at least one secondary coil arranged for electromagnetic induction from one of the primary coils;
      at least one light source; and
      at least one back-up battery; wherein
      said lighting module is arranged to seal the secondary coil, the at least one light source and the at least one back-up battery therein.

2. A lighting system as claimed in claim 1, wherein each lighting module further includes rectification means.

3. A lighting system as claimed in claim 1, wherein the at least one light source is at least one LED.

4. A lighting system as claimed in claim 1, wherein each lighting module further includes charging circuitry for charging the battery.

5. A lighting system as claimed in claim 1, wherein each lighting module further includes change over circuitry for change to battery power in the event of a mains failure.

6. A lighting system as claimed in claim 1, wherein the light sources form shapes.

7. A lighting system as claimed in claim 6 wherein the light sources form shapes and are made of points of light.

8. A lighting system as claimed in claim 6, wherein the shapes are directional arrows.

9. A lighting system as claimed in claim 6, wherein the shapes are words.

10. A sealed lighting module for use with a carrier of a primary source of electricity, and the separate having a plurality of primary coils, the sealed lighting module comprising:
    at least one secondary coil for electromagnetic induction from a primary coil of the separate carrier;
    at least one light source; and
    at least one back-up battery; wherein
    said lighting module is arranged to seal the secondary coil, the at least one light source and the at least one back-up battery therein.

11. A sealed lighting unit as claimed in claim 10, wherein each lighting module further includes rectification means.

12. A sealed lighting unit as claimed in claim 10, wherein the at least one light source is at least one LED.

13. A sealed lighting module as claimed in claim 10, wherein each lighting module further includes charging circuitry for charging the battery.

14. A sealed lighting module as claimed in claim 10, wherein each lighting module further includes charging circuitry for changing the battery.

15. A sealed lighting unit as claimed in claim 10, wherein the at least one light sources form shapes.

16. A sealed lighting unit as claimed in claim 15, wherein the light sources are made of points of light.

17. A sealed lighting unit as claimed in claim 15, wherein the shapes are directional arrows.

* * * * *

UNITED STATES PATENT AND TRADEMARK OFFICE
CERTIFICATE OF CORRECTION

| | | |
|---|---|---|
| PATENT NO. | : 7,199,529 B2 | Page 1 of 1 |
| APPLICATION NO. | : 10/508827 | |
| DATED | : April 3, 2007 | |
| INVENTOR(S) | : David Richard Vernon-Dier | |

It is certified that error appears in the above-identified patent and that said Letters Patent is hereby corrected as shown below:

Column 3, line 22, please replace "affected by on" with --affected by an--.

Column 4, line 7, please insert --.-- after the word "system".

Column 4, line 9, please insert --;-- after the word "track".

Column 6, line 6, claim 10, line 2, please insert the word --carrier-- after the word "separate".

Signed and Sealed this

Twenty-sixth Day of June, 2007

JON W. DUDAS
*Director of the United States Patent and Trademark Office*